UNITED STATES PATENT OFFICE.

CARL BOSCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

FERTILIZER AND FERTILIZING.

1,280,650.     Specification of Letters Patent.     Patented Oct. 8, 1918.

No Drawing.     Application filed November 24, 1914. Serial No. 873,827.

*To all whom it may concern:*

Be it known that I, CARL BOSCH, Ph. D., chemist, citizen of the German Empire, residing at Ludwigshafen-on-the-Rhine, Germany, have invented new and useful Improvements in Fertilizers and Fertilizing, of which the following is a specification.

The object of this invention is a new fertilizer containing as essential constituents urea and phosphoric acid in a combined state, which fertilizer is excellently suited for supplying both nitrogen and phosphoric acid to crops, since the urea and the phosphoric acid thereby offered in the particular form are easily taken up and assimilated by the plants, which thus obtain both the important elements, nitrogen and phosphorus. The urea combined with phosphoric acid exercises a better fertilizing action than does urea. The new compounds representing the object of this invention are obtained from urea and a super-phosphate. These may be complex calcium urea phosphates. For instance, if urea and a superphosphate containing primary calcium phosphate as its chief constituent be ground together, the mass may become moist, but soon loses its moistness and a dry loose powder is obtained which can easily be distributed over the ground. In some cases the powdery form can be produced or maintained by treating the mass with gaseous ammonia, and advantages are sometimes hereby attained, since if such treatment be omitted the mass, on being stored, may occasionally attract moisture and become less capable of being strewed over the ground. Instead of using gaseous ammonia, ammonium salts of volatile acids, for instance, ammonium carbamate, can be employed, and also the mass may be simultaneously treated with dry air or other gas. The proportion of urea to super-phosphate can be varied within very wide ranges, for instance, commercial superphosphate and urea can be mixed in such proportion, that the final product contains equal quantities of nitrogen and phosphorus pentoxid, such quantities varying say from nine to thirteen per cent. If desired, the urea may be taken in the form of urea nitrate.

Now what I claim is:—

1. A fertilizer containing as an essential constituent calcium urea phosphate.
2. A fertilizer containing calcium urea phosphate and ammonia.

In testimony whereof I have hereunto set my hand in the presence of two subscribing witnesses.

CARL BOSCH.

Witnesses:
   W. ERNST,
   H. MERLE COCHRAN.